(12) United States Patent　　　　　(10) Patent No.: US 12,612,934 B2
Kremmel　　　　　　　　　　　　　　(45) Date of Patent: Apr. 28, 2026

(54) HOUSEHOLD APPLIANCE TOE KICK PLATE FASTENING

(71) Applicant: Haier US Appliance Solutions, Inc., Wilmington, DE (US)

(72) Inventor: Aldo Vincent Kremmel, Palmyra, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/756,741

(22) Filed: Jun. 27, 2024

(65) Prior Publication Data

US 2026/0002556 A1　　Jan. 1, 2026

(51) Int. Cl.
　　　*F24C 15/08*　　　　(2006.01)
　　　*F16B 5/02*　　　　(2006.01)
(52) U.S. Cl.
　　　CPC ............... *F16B 5/02* (2013.01); *F24C 15/08* (2013.01)
(58) Field of Classification Search
　　　CPC .................................. F16B 5/02; F24C 15/08
　　　See application file for complete search history.

(56) References Cited

U.S. PATENT DOCUMENTS

| 4,290,660 | A | 9/1981 | Brezosky |
| 6,574,867 | B1 | 6/2003 | Bradshaw |

| 7,137,677 | B2 * | 11/2006 | Hong | ....................... F25D 23/00 |
| | | | | 312/265.6 |
| 2009/0096331 | A1 | 4/2009 | Park et al. | |
| 2011/0101836 | A1 | 5/2011 | Gamble et al. | |
| 2013/0113353 | A1 | 5/2013 | Carr et al. | |
| 2016/0304319 | A1 | 10/2016 | Gebhardt et al. | |
| 2022/0361671 | A1 | 11/2022 | Cornell et al. | |

FOREIGN PATENT DOCUMENTS

EP　　　　　2580383 B1　　12/2016

OTHER PUBLICATIONS

Fulgor-Milano, "Dishwasher Installation Manual", accessed https://www.fulgor-milano.com/sites/default/files/2020-09/F6DWT24SS2%20-%20Installation%20Manual.pdf on Jun. 27, 2024, 27 pages.

* cited by examiner

*Primary Examiner* — Jason L Vaughan
*Assistant Examiner* — Amanda Kreiling
(74) *Attorney, Agent, or Firm* — Dority & Manning, P.A.

(57) ABSTRACT

A toe kick plate is configured to couple to an appliance. The toe kick plate is defined between a top side, a bottom side, a front side, a back side, a first side, and a second side. The toe kick plate includes a first aperture and a second aperture through the toe kick plate from the front side to the back side. The first aperture is positioned proximate the first side of the toe kick plate and the second aperture is positioned proximate the second side of the toe kick plate. When mounting the toe kick plate to the appliance, the first aperture of the toe kick plate is configured to receive a protrusion from the appliance, and a fastener extends though the second aperture of the toe kick plate into a fixing hole of the appliance.

16 Claims, 6 Drawing Sheets

300

310

INSERT A PROTRUSION FROM AN APPLIANCE THROUGH A FIRST APERTURE
DEFINED BY A TOE KICK PLATE

320

ALIGN A SECOND APERTURE DEFINED BY THE TOE KICK PLATE
OVER A FIXING HOLE OF THE APPLIANCE

330

FASTEN A FASTENER THROUGH THE SECOND APERTURE DEFINED
BY THE TOE KICK PLATE

HOUSEHOLD APPLIANCE TOE KICK PLATE FASTENING

FIELD OF THE INVENTION

The present subject matter relates generally to household appliances, and more specifically to fastening toe kick plate to dishwashing appliances.

BACKGROUND OF THE INVENTION

An ergonomic choice for cabinetry manufacturers is to include a small recess at the base of cabinetry called a toe kick. The toe kick is set so that users may stand closer to the cabinetry when using a countertop or space above the cabinetry. When the user is closer to the countertop, the user may experience better balance and reduced fatigue when reaching across the countertop to work. In the absence of a toe kick, users may find themselves standing back from the countertop or cabinetry in order to avoid stubbing toes. Such a posture may lead to leaning over and putting considerable strain on the back, shoulders, and arms.

Appliance manufacturers have also adopted the idea of a toe kick. This has led to many appliances including a toe kick plate recessed and assembled on the appliance before the appliance is installed into the cabinetry. These toe kick plates may be built into the appliance at a fixed depth. When appliances are installed in a building, such as a household, the appliance may be installed straight into the cabinetry. Typical toe kicks are most often installed to the dishwasher frame with multiple fasteners, where the installer may use a power driver parallel to the floor to secure the multiple fasteners. Securing the toe kick may be difficult for an installer working in tight conditions.

Accordingly, an appliance that simplifies the installation of a toe kick plate would be advantageous.

BRIEF DESCRIPTION OF THE INVENTION

Aspects and advantages of the invention will be set forth in part in the following description, or may be apparent from the description, or may be learned through practice of the invention.

In one example embodiment, an appliance is provided. The appliance defines a vertical direction, a lateral direction, and a transverse direction. The vertical, lateral, and transverse directions are mutually perpendicular. The appliance includes a frame defining a top side, a bottom side, a front side, a back side, a first side, and a second side of the appliance. The frame includes a first leg extending from the bottom side of the frame and a second leg extending from the bottom side of the frame. The first leg includes a protrusion extending in the transverse direction from the front side of the frame. The second leg defines a fixing hole. The appliance also includes a toe kick plate defined between a top side, a bottom side, a front side, a back side, a first side, and a second side. The toe kick plate is positioned over the first leg and the second leg at the front side of the frame. The toe kick plate defines a first aperture and a second aperture through the toe kick plate from the front side to the back side. The first aperture is positioned proximate the first side of the toe kick plate and the second aperture is positioned proximate the second side of the toe kick plate. When mounting the toe kick plate to the appliance, the first aperture of the toe kick plate receives the protrusion of the first leg, and a fastener extends though the second aperture of the toe kick plate into the fixing hole of the second leg.

In another example embodiment, a toe kick plate configured to couple to an appliance is provided. The toe kick plate is defined between a top side, a bottom side, a front side, a back side, a first side, and a second side. The toe kick plate includes a first aperture and a second aperture through the toe kick plate from the front side to the back side. The first aperture is positioned proximate the first side of the toe kick plate and the second aperture is positioned proximate the second side of the toe kick plate. When mounting the toe kick plate to the appliance, the first aperture of the toe kick plate is configured to receive a protrusion from the appliance, and a fastener extends though the second aperture of the toe kick plate into a fixing hole of the appliance.

In another example embodiment, a method for assembling a toe kick plate to an appliance is provided. The method includes inserting a protrusion from the appliance through a first aperture defined by the toe kick plate, aligning a second aperture defined by the toe kick plate over a fixing hole of the appliance, and fastening a fastener through the second aperture defined by the toe kick plate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
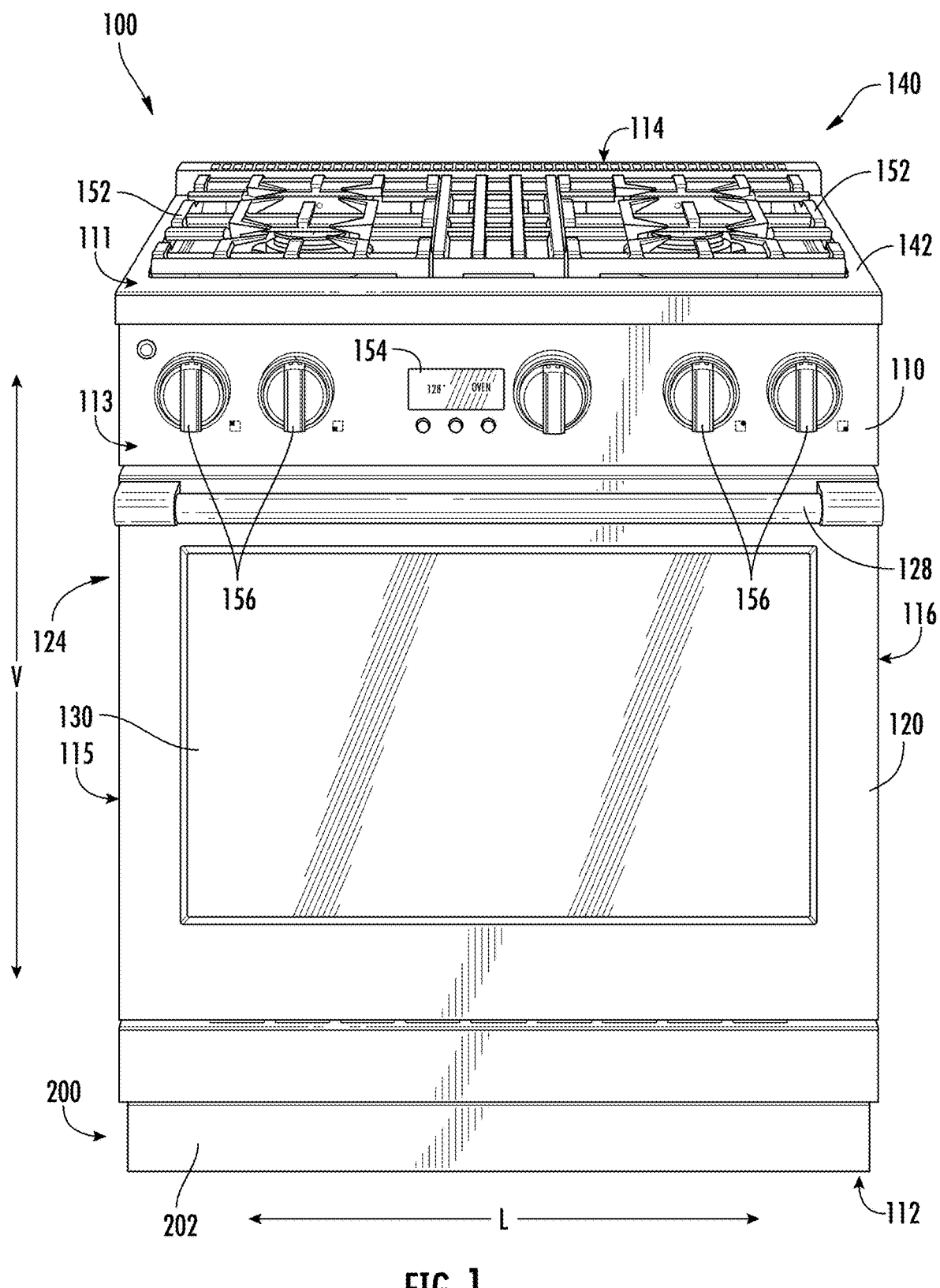
FIG. 1 provides a front, perspective view of a range appliance according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Figure 2:
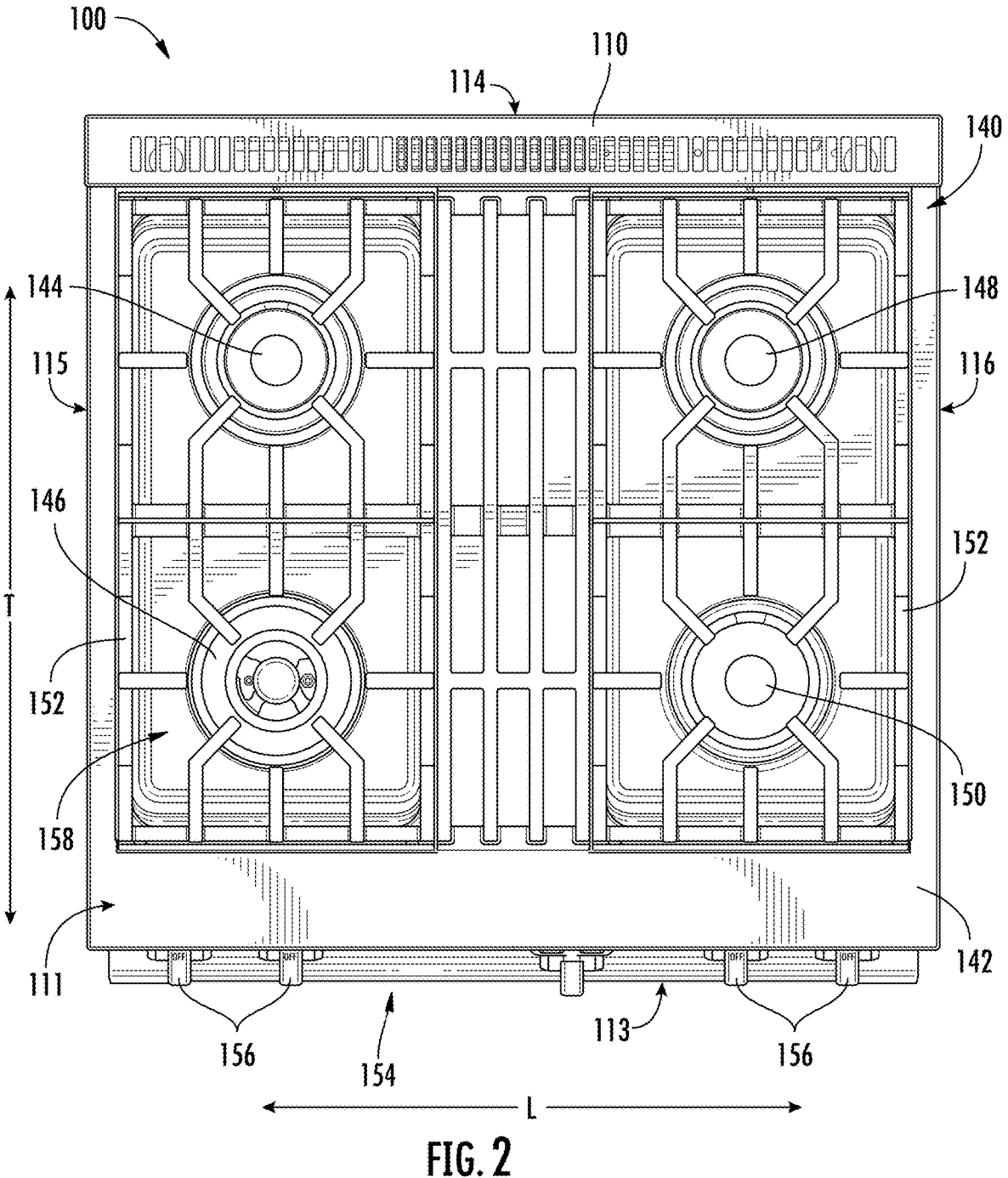
FIG. 2 provides a top, plan view of the example range appliance of FIG. 1.

Referring now to the figures, illustrated in FIG. 1 is an appliance 100 defining a vertical direction V, a lateral direction L, and a transverse direction T. The vertical, lateral, and transverse directions may be mutually perpendicular. In particular, FIG. 1 provides a front, perspective view of an example range appliance 100 with an example toe kick plate assembly 200, and FIG. 2 provides a top, plan view of range appliance 100. As will be understood by those skilled in the art, range appliance 100 is provided by way of example only, and the present subject matter may be used in any suitable appliance, e.g., a double oven range appliance, a dishwasher appliance, a refrigerator appliance, a freezer appliance, a wine cooler appliance, a trash compactor, a stand-alone icemaker appliance, etc. Thus, the example embodiment shown in FIGS. 1 and 2 are not intended to limit the present subject matter to any particular cooking chamber configuration, arrangement, or appliance.

In general, range appliance 100 may include a frame 110, or in some example embodiments, a cabinet. In general, frame 110 may extend between a top side 111 and a bottom side 112 in the vertical direction V, a front side 113 and a back side 114 in the transverse direction T, and a first side 115 and a second side 116 in the lateral direction L. In the present example embodiment, frame 110 may be an insulated cabinet defining a cooking chamber 120. Cooking chamber 120 may be configured for the receipt of one or more food items to be cooked. Range appliance 100 may generally include a door 124 rotatably attached to cabinet 110 in order to provide selective access to cooking chamber 120. A handle 128 may mount to door 124 to assist a user with opening and closing door 124 to access cooking chamber 120. As an example, a user may pull on handle 128 mounted to door 124 to open and access cooking chamber 120 or a user may push on handle 128 to close door 124. A glass windowpane 130 may provide for viewing the contents of cooking chamber 120 when door 124 is closed, and also may assist with insulating cooking chamber 120. Heating elements (not shown) may be provided within cooking chamber 120 in order to heat cooking chamber 120. In general, the heating elements may be electric resistance heating elements, gas burners, microwave heating elements, halogen heating elements, or suitable combinations thereof. In the present example embodiment, range appliance 100 may also include a cooktop 140. In general, cooktop 140 may be positioned at or adjacent top side 111 of frame 110.

Thus, cooktop 140 may be positioned above cooking chamber 120. In general, cooktop 140 may include a top panel 142, which, by way of example, may be constructed of glass, ceramics, enameled steel, and combinations thereof. In general, a utensil, such as a pot, pan, etc., holding food and/or cooking liquids (e.g., oil, water, etc.) may be placed onto grates 152 at a location of any heating elements, such as burner assemblies 144, 146, 148, 150. Grates 152 may be supported on a top surface 158 of top panel 142. Burner assemblies 144, 146, 148, 150 may provide thermal energy to cooking utensils on grates 152. As shown in FIG. 1, burners assemblies 144, 146, 148, 150 may be configured in various sizes so as to receive cooking utensils (i.e., pots, pans, etc.) of various sizes and configurations and to provide different heat inputs for such cooking utensils.

In general, a user interface panel 154 may be positioned at top side 111 of range appliance 100. In the present example embodiment, user interface panel 154 includes knobs 156 that are each associated with one of burner assemblies 144, 146, 148, and 150. In particular, knobs 156 may activate each burner assembly and control the amount of heat input provided by each burner assembly 144, 146, 148, and 150 to a cooking utensil located thereon. User interface panel 154 may also be provided with one or more graphical display devices that may deliver information to a user, such as whether a particular burner assembly is activated and/or a power level at which the burner assembly is set.

Although shown with knobs 156, it should be understood that knobs 156 and the configuration of range appliance 100 shown in FIGS. 1 and 2 are provided by way of example only. More specifically, user interface panel 154 may include various input components, such as one or more of a variety of touch-type controls, electrical, mechanical, or electro-mechanical input devices including rotary dials, push buttons, and touch pads. The user interface panel 154 may include other display components, such as a digital or analog display device designed to provide operational feedback to a user.

Figure 3:
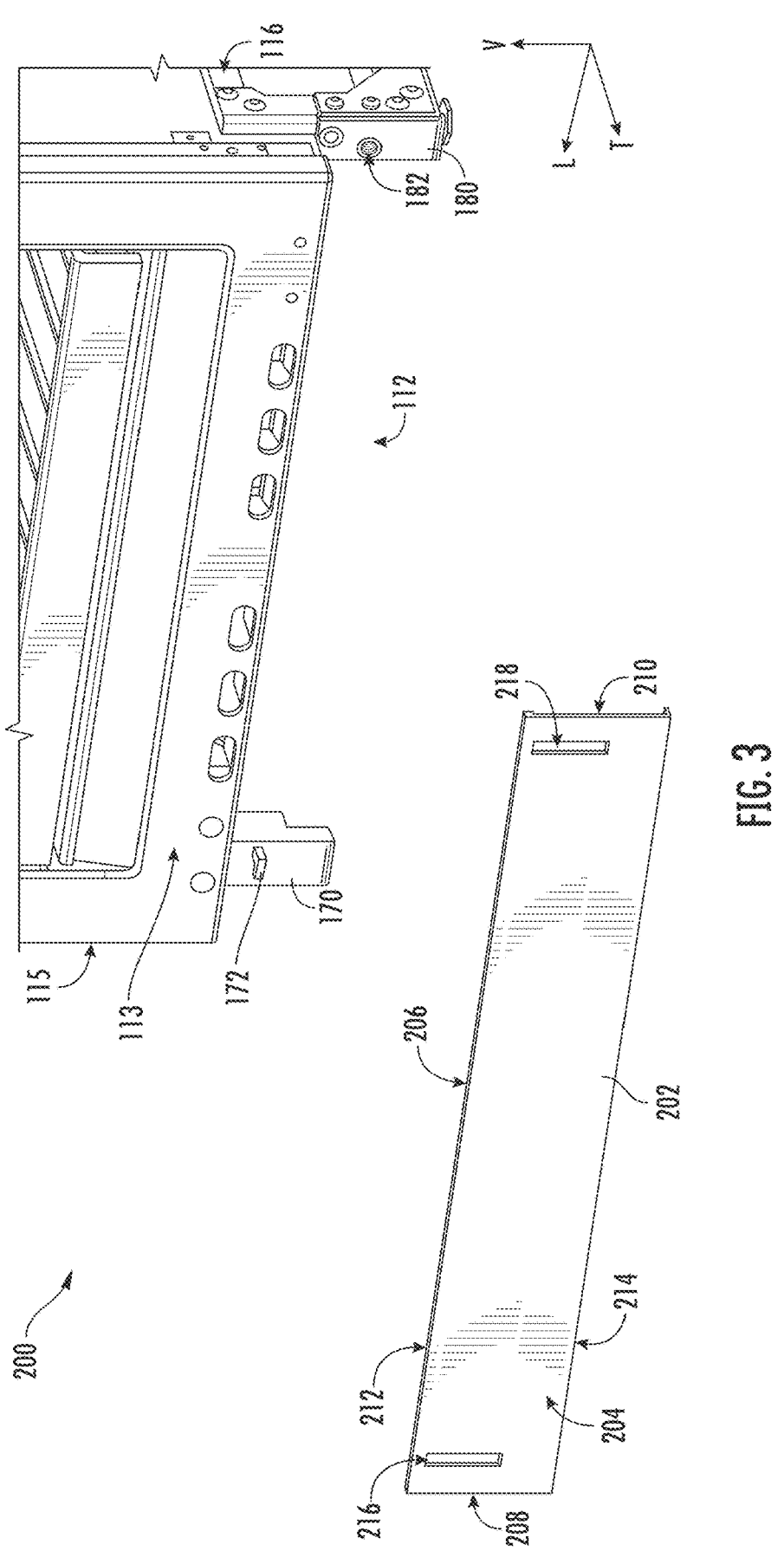
FIG. 3 illustrates an exploded perspective view of a toe kick plate assembly of the example range appliance of FIG. 1.

FIG. 3 provides an exploded view of a toe kick plate assembly 200 according to an example embodiment of the present disclosure. In general, toe kick plate assembly 200 may approximately match the depth of a toe kick of adjoining cabinetry. In general, toe kick plate 202 of toe kick plate assembly 200 may be a decorative piece or panel made of a suitable material, such as stainless steel, wood, plastic, or other such materials, and may be selected by a consumer to match appliance 100 or the adjacent cabinetry.

As illustrated in FIG. 3, frame 110 may include a first leg 170 extending from bottom side 112 of frame 110 and a second leg 180 extending from bottom side 112 of frame 110. In particular, first leg 170 may be proximate first side 115, such as adjacent to first side 115, or closer to first side 115 than second side 116, and second leg 180 may be proximate second side 116, such as adjacent to second side 116, or closer to second side 116 than first side 115. In general, first leg 170 may include a protrusion 172 extending in the transverse direction T and lateral direction L from front side 113 of frame 110, e.g., protrusion 172 may be a bent tab which may be generally hook shaped. In other example embodiments, protrusion 172 may be a rivet extending from first leg 170. In general, second leg 180 may define a fixing hole 182, such as a threaded hole configured to receive a fastener 184 (FIG. 4) such as a screw or a bolt, as will be explained further below.

Figure 5:
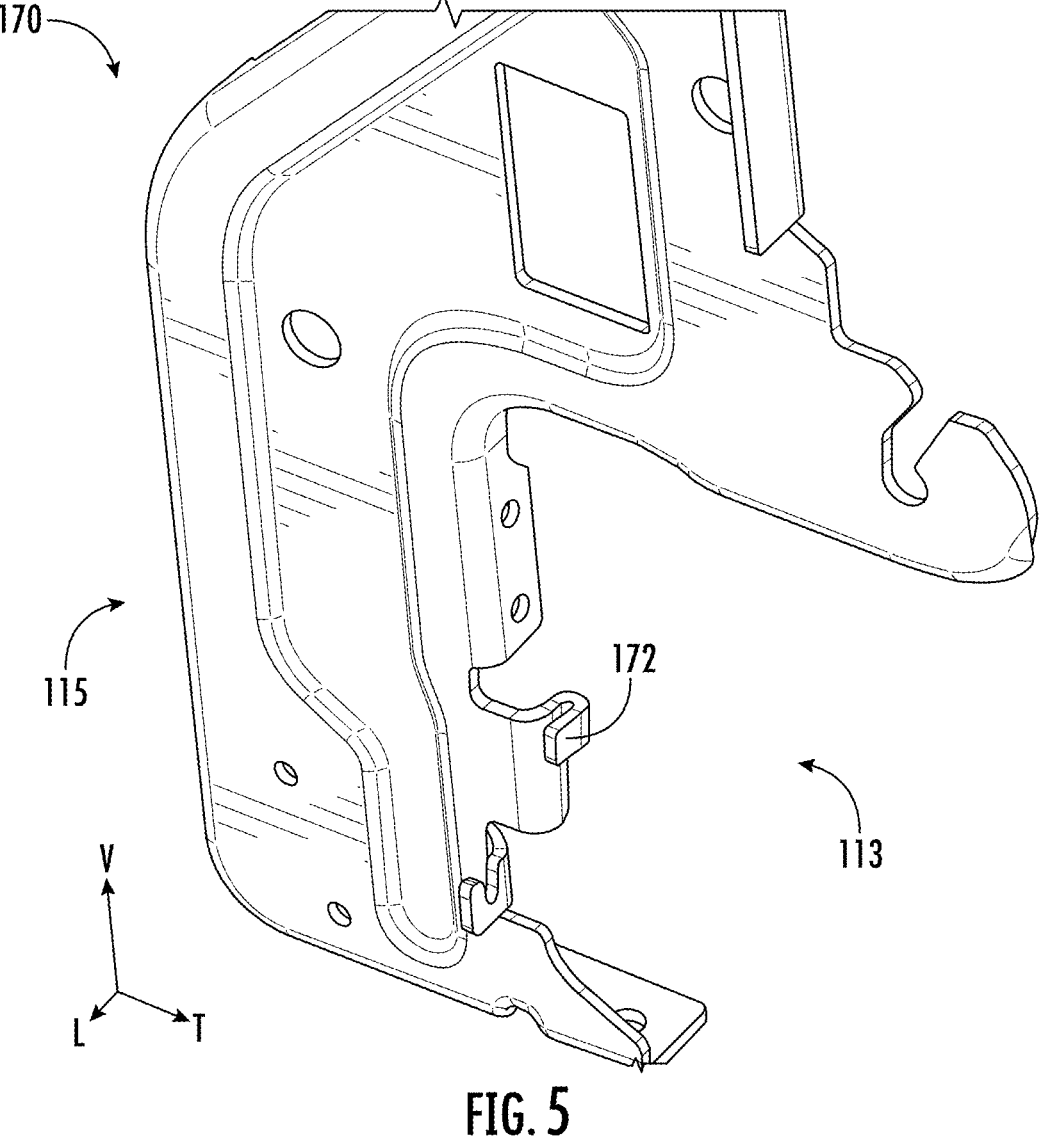
FIG. 5 illustrates a protrusion from a leg of the example range appliance of FIG. 1, according to an example embodiment of the present disclosure.

Turning briefly ahead to FIG. 5, illustrated is an example embodiment of first leg 170. In particular, as stated above, first leg 170 may include a protrusion 172 extending in the transverse direction T and lateral direction L from front side 113 of frame 110. As illustrated, protrusion 172 may be a bent tab, extending initially in the transverse direction T and then bending to the lateral direction L, forming, generally, a hook shape.

Returning to FIG. 3, in general, toe kick plate 202 may be defined between a top side 212 and a bottom side 214 in the vertical direction V, a front side 204 and a back side 206 in the transverse direction T, and a first side 208 and a second side 210 in the lateral direction L. In general, toe kick plate 202 may be positioned over first leg 170 and second leg 180 at front side 113 of frame 110. In general, toe kick plate 202 may define a first aperture 216 and a second aperture 218 through toe kick plate 202 from front side 204 to back side 206. In particular, first aperture 216 may be positioned proximate first side 115 of toe kick plate 202, such as closer to first side 208 than second side 210, and second aperture 218 may be positioned proximate second side 210 of toe kick plate 202, such as closer to second side 210 than first side 208. In general, first aperture 216 and/or second aperture 218 defined by toe kick plate 202 may be pass-through, clearance aperture, e.g., an oversized opening, as will be explained below. In some example embodiment, such as is illustrated in FIGS. 3 and 4, first aperture 216 and second aperture 218 may be slots extending in the vertical direction V between top side 212 and bottom side 214 of toe kick plate 202.

Figure 4:
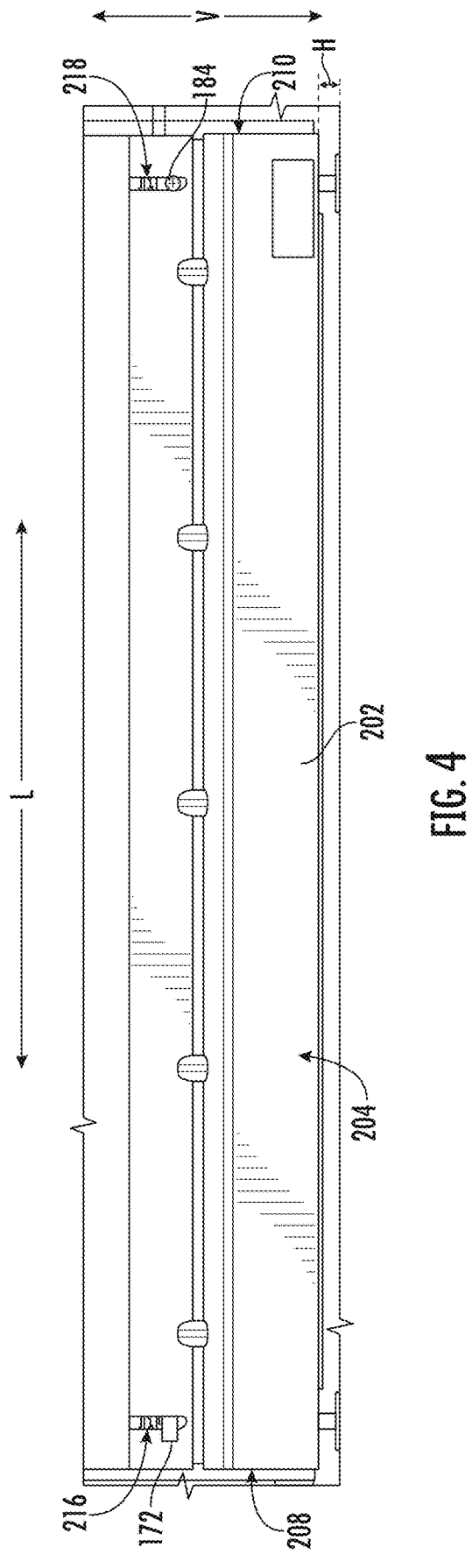
FIG. 4 illustrates a front view of the toe kick plate assembly of FIG. 3.

Turning now to FIG. 4, illustrated is a front view of an example embodiment of toe kick plate assembly 200. When mounting toe kick plate 202 to appliance 100, first aperture 216 of toe kick plate 202 may receive protrusion 172 of first leg 170, and fastener 184 may extend though second aperture 218 of toe kick plate 202 into fixing hole 182 of second leg 180, thus securing toe kick plate 202 to appliance 100. In general, fastener 184 extending though second aperture 218 of toe kick plate 202 may be one or more of a bolt and a screw, or any other suitable threaded fastener. Further, toe kick plate 202 may be mounted to appliance 100 at a selected height H, e.g., during the mounting of toe kick plate 202 to appliance 100 first aperture 216 and second aperture 218 of toe kick plate 202 may translate in the vertical direction V over protrusion 172 and fastener 184, respectively, for the desired height H. For example, height H may be between one tenth of an inch (0.1 in) and two inches (2 in), such as between one quarter of an inch (0.25 inch) and one inch (1 in), such as between one third of an inch (0.33 in) and three quarters of an inch (0.75).

As one skilled in the art will appreciate, the above described embodiments are used only for the purpose of explanation. Modifications and variations may be applied, other configurations may be used, and the resulting configurations may remain within the scope of the invention. For example, appliance 100 is provided by way of example only and aspects of the present subject matter may be incorporated into any other suitable appliance.

Figure 6:
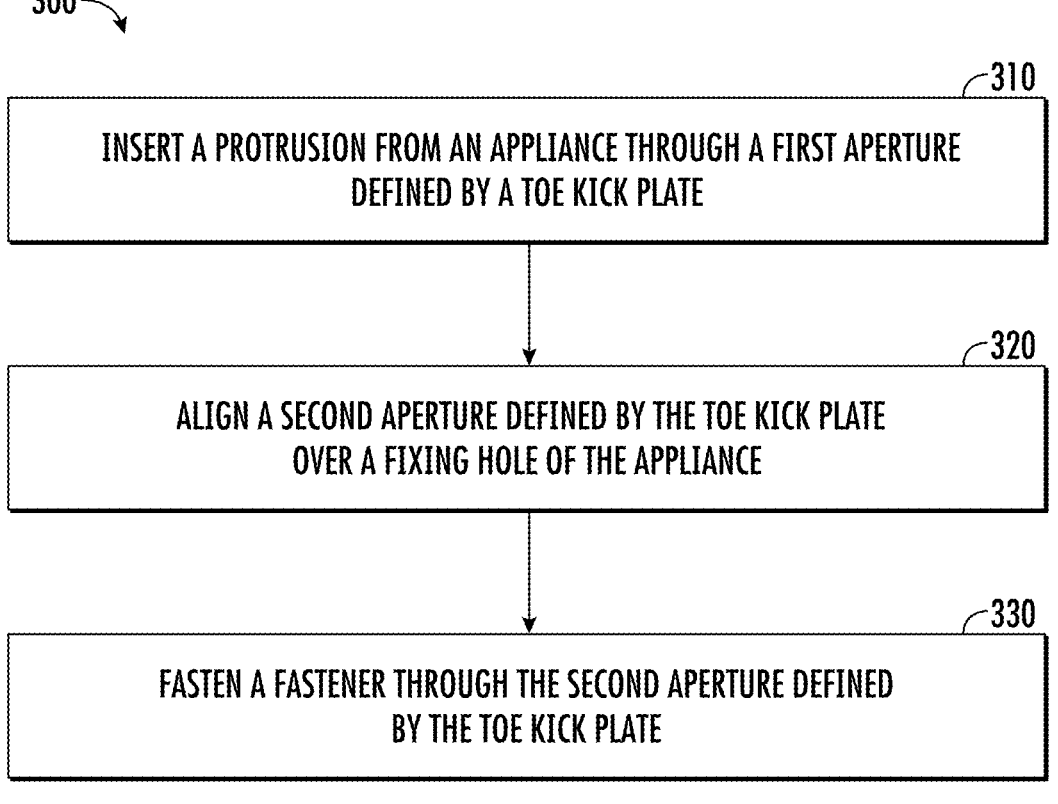
FIG. 6 provides a flowchart of a method of assembling a toe kick plate to an appliance according to an example embodiment of the present disclosure.

Referring now to FIG. 6, a flow diagram of one embodiment of a method 300 of assembling a toe kick plate to an appliance is illustrated in accordance with aspects of the present subject matter. In general, method 300 will be described herein with reference to the embodiments of appliance 100 and related elements described above with reference to FIGS. 1-5. However, it should be appreciated by those of ordinary skill in the art that the disclosed method 300 may generally be utilized in association with apparatuses and systems having any other suitable configuration. One skilled in the art, using the disclosures provided herein, will appreciate that various steps of the method disclosed herein can be omitted, rearranged, combined, and/or adapted in various ways without deviating from the scope of the present disclosure.

As shown in FIG. 6, at (310), method 300 may generally include inserting a protrusion from the appliance through a first aperture defined by the toe kick plate. In the present example embodiment, protrusion 172 from first leg 170 of appliance 100 may be inserted through first aperture 216 defined within toe kick plate 202. In particular, first aperture 216 defined within toe kick plate 202 may be a pass-through, clearance aperture, or, an oversized opening, such that first aperture 216 may slide over protrusion 172 and move at least slightly, such as within one half of an inch (0.5 in), in the lateral direction L.

At (320), method 300 may generally include aligning a second aperture defined by the toe kick plate over a fixing hole of the appliance. In the present example embodiment, second aperture 218 defined within toe kick plate 202 may be aligned over fixing hole 182 of second leg 180 of appliance 100. Further, when aligning second aperture 218 over fixing hole 182 of appliance 100, toe kick plate 202 may be aligned and mounted to appliance 100 at the selected height, as described above.

At (330), method 300 may generally include fastening a fastener through the second aperture defined by the toe kick plate. In the present example embodiment, fastener 184 may be placed and extended through second aperture 218 defined within toe kick plate 202 and fastened, such as by twisting, into fixing hole 182. Accordingly, toe kick plate 202 of toe kick plate assembly 200 may be secured to appliance 100 via protrusion 172 and a singular fastener 184, e.g., fastener 184 is the only fastener (screw/bolt) coupled to/through toe kick plate 202.

As may be seen from the above, a toe kick plate may be installed/mounted to an appliance with only one screw. The toe kick plate may include an oversized pass-through clearance hole/slot to slide over a protrusion (rivet, formed bend tab) of a leg of the appliance. The toe kick may slide in a lateral direction and a vertical direction to align a slot at an opposite end of the toe kick plate with a screw hole. The toe kick plate may held by the protrusion of the leg, and fastened in place with a screw on the opposite end. The toe kick plate may translate vertically in the slot to adjust a height of the toe kick plate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance defining a vertical direction, a lateral direction, and a transverse direction, the vertical, lateral, and transverse directions being mutually perpendicular, the appliance comprising:

a frame defining a top side, a bottom side, a front side, a back side, a first side, and a second side of the appliance, the frame comprising a first leg extending from the bottom side of the frame and a second leg extending from the bottom side of the frame, the first leg comprising a protrusion extending in the transverse direction from the front side of the frame, the second leg defining a fixing hole;

a toe kick plate defined between a top side, a bottom side, a front side, a back side, a first side, and a second side, the toe kick plate positioned over the first leg and the second leg at the front side of the frame, the toe kick plate defining a first aperture and a second aperture through the toe kick plate from the front side to the back side, the first aperture positioned proximate the first side of the toe kick plate and the second aperture positioned proximate the second side of the toe kick plate, wherein, when mounting the toe kick plate to the appliance, the first aperture of the toe kick plate receives the protrusion of the first leg, and a fastener extends though the second aperture of the toe kick plate into the fixing hole of the second leg.

2. The appliance of claim 1, wherein the first aperture and the second aperture are slots extending in the vertical direction between the top side and the bottom side of the toe kick plate.

3. The appliance of claim 1, wherein the toe kick plate is mounted to the appliance at a selected height.

4. The appliance of claim 1, wherein the first aperture and the second aperture defined by the toe kick plate are pass-through, clearance aperture.

5. The appliance of claim 1, wherein the protrusion extending from the first leg is one or more of a rivet and a bent tab.

6. The appliance of claim 1, wherein the fastener extending though the second aperture of the toe kick plate comprises one or more of a bolt and a screw.

7. A toe kick plate configured to couple to an appliance, the toe kick plate defined between a top side, a bottom side, a front side, a back side, a first side, and a second side, the toe kick plate comprising:

a first aperture and a second aperture through the toe kick plate from the front side to the back side, the first aperture positioned proximate the first side of the toe kick plate and the second aperture positioned proximate the second side of the toe kick plate, wherein the first aperture and the second aperture are slots extending between the top side and the bottom side of the toe kick plate, and wherein, when mounting the toe kick plate to the appliance, the first aperture of the toe kick plate is configured to receive a protrusion from the appliance, and a fastener extends though the second aperture of the toe kick plate into a fixing hole of the appliance.

8. The toe kick plate of claim 7, wherein the toe kick plate is mounted to the appliance at a selected height.

9. The toe kick plate of claim 7, wherein the first aperture and the second aperture defined by the toe kick plate are pass-through, clearance aperture.

10. The toe kick plate of claim 7, wherein the protrusion extending from the appliance is one or more of a rivet and a bent tab.

11. The toe kick plate of claim 7, wherein the fastener extending though the second aperture of the toe kick plate comprises one or more of a bolt and a screw.

12. A method for assembling a toe kick plate to an appliance comprising:

inserting a protrusion from the appliance through a first aperture defined by the toe kick plate;

aligning a second aperture defined by the toe kick plate over a fixing hole of the appliance; and fastening a fastener through the second aperture defined by the toe kick plate, wherein the first aperture and the second aperture of the toe kick plate are slots extending in a vertical direction between a top side and a bottom side of the toe kick plate.

13. The method of claim 12, wherein aligning the second aperture over the fixing hole of the appliance comprises mounting the toe kick plate to the appliance at a selected height.

14. The method of claim 12, wherein the first aperture and the second aperture defined by the toe kick plate are pass-through, clearance apertures.

15. The method of claim 12, wherein the protrusion extending from the appliance is one or more of a rivet and a bent tab.

16. The method of claim 12, wherein the fastener fastened though the second aperture of the toe kick plate comprises one or more of a bolt and a screw.

* * * * *